No. 626,857. Patented June 13, 1899.
E. CHILDREN.
CULTIVATOR.
(Application filed Feb. 14, 1899.)

(No Model.)

Witnesses:
G. A. Pennington
Jas. H. Finlaw

Inventor:
Edwin Children,
by R. S. Bacon
Atty.

THE NORRIS PETERS CO., PHOTO-LITHO., WASHINGTON, D. C.

UNITED STATES PATENT OFFICE.

EDWIN CHILDREN, OF COUNCIL BLUFFS, IOWA.

CULTIVATOR.

SPECIFICATION forming part of Letters Patent No. 626,857, dated June 13, 1899.

Application filed February 14, 1899. Serial No. 705,477. (No model.)

*To all whom it may concern:*

Be it known that I, EDWIN CHILDREN, a citizen of the United States, residing at Council Bluffs, in the county of Pottawattamie and State of Iowa, have invented certain new and useful Improvements in Cultivators; and I do hereby declare the following to be a full, clear, and exact description of the invention, such as will enable others skilled in the art to which it appertains to make and use the same.

This invention relates to an improvement in cultivators, and more particularly to that class where a plurality of gangs are employed.

The invention is embodied in the construction, arrangement, and combination of parts hereinafter described, and defined in the claims.

Cultivators have heretofore been made where the gangs were movable transversely of the machine, so as to adjust themselves independently of each other and independently of the frame of the cultivator to the irregularities and varying widths common to successive rows of plants by the contact of said gangs with the ground.

The objects of my invention are to construct and arrange a machine wherein the gangs are movable transversely of the machine and so that said transverse movement shall be simultaneous and equal and said gangs thereby automatically accommodating and adjusting themselves to the irregularities of the ground and rows of plants, so that, especially when the machine is used with listed corn, a uniform cultivation can be made irrespective of irregularities of the rows, ridges, and slopes and to hold the frame of the cultivator, with the ordinary driver's seat thereon, in a position midway between the two outermost gangs irrespective of the transverse movement of said gangs, and, further, to provide a cultivator of the transversely-adjustable type with means whereby the draft is applied direct to the gangs, as distinguished from those machines wherein the draft is applied to the frame and through the frame and connections to the gangs, plows, or shoes.

The objects of the invention are attained by the construction illustrated in the accompanying drawings. I desire it understood that the construction illustrated represents a practical embodiment of the invention and that the same is shown for the purpose of illustration and explanation and not for the purpose of limitation.

Figure 1:
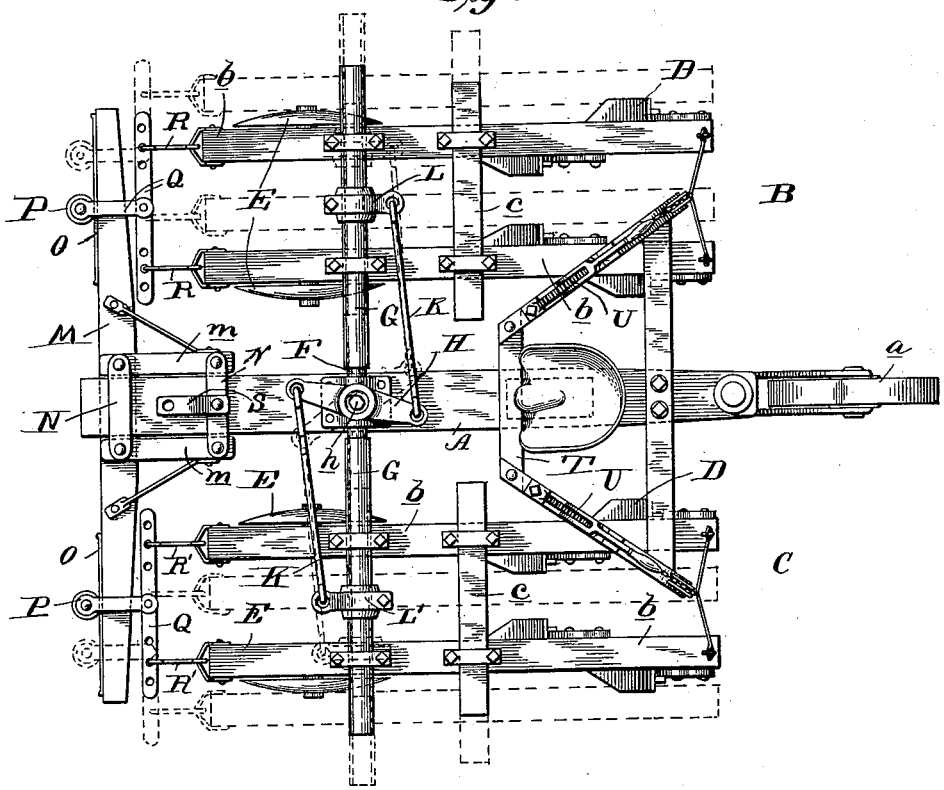
Figure 2:
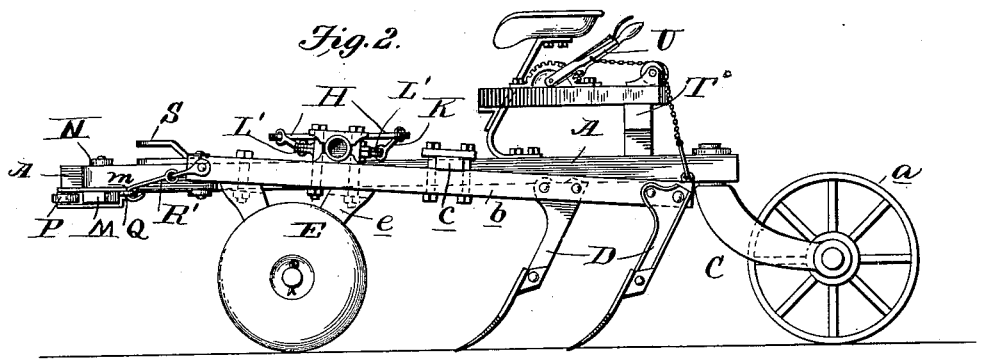

In the drawings, Figure 1 is a top plan view of the improvement, and Fig. 2 is a side elevation of the same.

A designates the center piece or beam, the same being of the single-piece type. It may, however, be of any of the usual or desired types of construction. This beam carries a caster-wheel $a$ at its rear and extends conveniently from front to rear of the machine.

The gangs B and C are located on the opposite sides of the beam A and may be of any desired or convenient formation, those shown consisting of the longitudinal bars $b$, united rigidly by the cross-bar $c$ and carrying the shoes or plows D at or near their rear portions. At their forward ends each bar $b$ has a depending bracket $e$ thereon, on the lower ends of which concavo-convex wheels E are mounted. These wheels E are arranged with their concaved faces facing each other on the companion bars $b$. These wheels and bars $b$ are so spaced as to span the row of growing plants and to ride with their curved sloping outer faces adjacent the sides of the adjacent ridges. The wheels serve as supports for the forward part of the machine.

On the beam A, slightly in advance of the center, is rigidly secured in any convenient manner a coupling-bar F, which extends out laterally in opposite directions for a considerable distance, the projecting portions extending into hollow pipe-shaped bars G, which are rigidly secured to the gangs in alinement with the coupling-bar. The coupling-bar F is shaped to loosely enter the bars G, so that the latter can be moved back and forth on the former when the gangs are adjusting themselves to variations of the surface.

To secure a simultaneous and equal movement of the gangs, I pivotally secure a horizontal lever H on the beam, conveniently on a pin $h$ on the coupling-bar connection. This lever H extends equally in opposite directions and has loosely connected to its opposite ends the rods K, which in turn are loosely connected to rigid oppositely-extending arms L L' on the hollow bars G. By this means it will be readily seen that an out or in movement of one gang causes a corresponding movement of the opposite gang, the beam remaining in the center. It will also be noticed that the action is wholly automatic, requiring no attention from the operator.

To secure a direct draft on the gangs, I place a draft-bar M at the front of the machine, the same extending across the front from side to side. This draft-bar is loosely supported on the forward end of the beam A, the bar being rigidly secured to two parallel arms or hounds m, lying close to the sides of the beam and being connected on their upper and lower faces by the straps N, which span the beam, but are not connected thereto. This connection permits a slight back-and-forth movement of the draft-bar on the beam, which latter may properly be said to be a guide and support for the draft-bar.

On the forward edges of the draft-bar are conveniently secured tracks O, on which trolley-wheels P move. The wheels P are connected by metallic clips to perforated bars Q. Located directly back of the draft-bar R R' are hooks, secured on the ends of bars b, their hooked ends taking through perforations in the bars Q. Should it be necessary to change the relative position of the bars b, the hooks can be engaged through other perforations in the bars Q, the series of perforations being provided for that purpose.

To the upper rear cross-strap N is secured the tree-clevis S, to which the single, double, or triple tree is secured. By this means the draft is always on the draft-bar and through it to the gangs, and by the special arrangement described the gangs, while securing the direct draft, are still permitted to move and respond to irregularities.

I have shown the seat-support T slightly farther to the rear than is necessary and adjacent thereto the elevating means U. These features form no part of my invention.

I desire it understood that any desirable form of gangs can be used and that the general construction and arrangement can be varied, as well as that of the specific parts specified, without departing from the nature and principle of the invention.

Having thus described my invention, what I claim as new, and desire to secure by Letters Patent, is—

1. In a cultivator, the combination with oppositely-arranged gangs, of means acting automatically to shift the gangs transversely and connected mechanism for imparting a simultaneous and equal movement to the oppositely-arranged gangs upon the movement of either gang, substantially as described.

2. In a cultivator, the combination with oppositely-arranged gangs or cultivating instrumentalities, of wheels connected with the gangs for moving the same transversely and connected mechanism between the gangs for simultaneously moving the same relative to each other equally and automatically, substantially as described.

3. In a cultivator, the combination with a beam of cultivating instrumentalities located on opposite sides thereof, and having a loose connection therewith, connected mechanisms between the gangs for moving the same in unison and means carried by the gangs and arranged to engage the ground for varying their position relative to the beam upon the occurrence of irregularites on the surface, substantially as described.

4. In a cultivator, the combination with a beam of gangs on opposite sides thereof, sliding connections between the beam and gangs, a lever on the beam, connections extending respectively from the opposite ends of the lever to the gangs, and means on the gangs for shifting the same transversely upon engagement of irregularities on the ground, substantially as described.

5. In a cultivator, the combination with transversely-movable gangs, of a draft-beam and a movable connection between the respective gangs and the draft-beam, substantially as described.

6. In a cultivator, the combination with oppositely-arranged gangs, and means for moving the same transversely of the machine, a draft-bar loosely supported on the machine, and automatically-adjustable connections between the draft-bar and the gangs, substantially as described.

7. In a cultivator, the combination with a beam and transversely-adjustable gangs on opposite sides thereof, of a draft-bar slidingly mounted on the beam and connections between the gangs and opposite ends of the draft-bar comprising movable members bearing against the draft-bar and linked connections between the same and gangs.

8. In a cultivator, the combination with oppositely-arranged gangs, of means for shifting the gangs automatically toward and from each other, connected mechanism between the gangs for effecting a simultaneous and equal adjustment of the same, a draft member and movable connections between the draft member and the gangs, substantially as described.

In testimony whereof I affix my signature in presence of two witnesses.

EDWIN CHILDREN.

Witnesses:
KATHRYN L. WILLIAMS,
CARROLL W. KIMBALL.